US012772933B2

(12) United States Patent
Todderud et al.

(10) Patent No.: US 12,772,933 B2
(45) Date of Patent: Oct. 27, 2026

(54) BACKSHEET EXTENSION FOR AN AGRICULTURAL HEADER

(71) Applicants: CNH Industrial America LLC, New Holland, PA (US); CNH Industrial Belgium N.V., Zedelgem (BE)

(72) Inventors: Stephen Todderud, Lancaster, PA (US); Herbert M. Farley, Elizabethtown, PA (US); Joel T. Cook, Akron, PA (US); Cory Conway, Idaho Falls, ID (US); Dan Garland, Solon, IA (US); Stijn Borry, Pittem (BE)

(73) Assignees: CNH INDUSTRIAL AMERICA LLC, New Holland, PA (US); CNH INDUSTRIAL BELGIUM N.V., Zedelgem (BE)

( * ) Notice: Subject to any disclaimer, the term of this patent is extended or adjusted under 35 U.S.C. 154(b) by 605 days.

(21) Appl. No.: 18/120,479

(22) Filed: Mar. 13, 2023

(65) Prior Publication Data

US 2024/0306549 A1 Sep. 19, 2024

(51) Int. Cl.
*A01D 75/00* (2006.01)
*A01D 61/00* (2006.01)

(52) U.S. Cl.
CPC ........... *A01D 75/00* (2013.01); *A01D 61/004* (2013.01)

(58) Field of Classification Search
CPC ....... A01D 75/00; A01D 61/004; A01D 41/14
See application file for complete search history.

(56) References Cited

U.S. PATENT DOCUMENTS 2,311,865 A * 2/1943 Pilcher .................. B65G 65/22 56/122
3,423,915 A * 1/1969 Louthan ................. A01D 41/14 56/158
3,451,530 A * 6/1969 Shumway ............. A01D 61/00 198/600
3,474,602 A * 10/1969 Molzahn ................ A01D 43/00 56/14.4
3,525,204 A 8/1970 Dovochak
3,913,247 A * 10/1975 Ruhl ....................... E01H 5/098 37/258

(Continued)

FOREIGN PATENT DOCUMENTS

AU 2014202967 B2 * 5/2019 ............. A01D 57/20
EP 2132976 A1 * 12/2009 ............. A01D 57/20

(Continued)

OTHER PUBLICATIONS

Messick's, 3162—Draper Header, retrieved Mar. 9, 2023, 2 pgs.

*Primary Examiner* — Arpad Fabian-Kovacs
(74) *Attorney, Agent, or Firm* — Fletcher Yoder, P.C.

(57) ABSTRACT

A backsheet extension for an agricultural header includes a deflector configured to couple to a top frame member of the agricultural header. The top frame member is positioned proximate to a compression auger of the agricultural header, and the deflector is configured to extend upwardly from the top frame member to block crop material from exiting the agricultural header. Furthermore, a leading edge of the deflector is configured to be positioned forward of the top frame member and to strip the crop material from the compression auger, and the deflector extends from the leading edge to a trailing edge.

20 Claims, 4 Drawing Sheets

(56) References Cited

U.S. PATENT DOCUMENTS

| | | | | |
|---|---|---|---|---|
| 7,520,117 | B2 * | 4/2009 | Rieck | A01D 45/021 56/62 |
| 8,166,738 | B1 * | 5/2012 | Coers | A01D 61/002 56/181 |
| 8,286,411 | B2 | 10/2012 | Barnett et al. | |
| 9,820,434 | B2 * | 11/2017 | McCrea | A01D 34/40 |
| 2007/0186529 | A1 * | 8/2007 | Rieck | A01D 41/12 56/14.5 |
| 2010/0281835 | A1 * | 11/2010 | Tipnis | A01D 41/14 29/428 |
| 2010/0326035 | A1 * | 12/2010 | Schrattenecker | A01D 41/14 56/51 |
| 2012/0311987 | A1 * | 12/2012 | Koch | A01D 57/26 56/229 |
| 2013/0111869 | A1 * | 5/2013 | Koch | A01D 41/14 56/375 |
| 2015/0272002 | A1 * | 10/2015 | Honey | A01D 57/02 56/153 |
| 2018/0084721 | A1 * | 3/2018 | Walker | A01D 41/06 |
| 2018/0271019 | A1 * | 9/2018 | Noll | A01D 41/127 |
| 2020/0359564 | A1 * | 11/2020 | Bell | A01D 57/20 |
| 2021/0112716 | A1 * | 4/2021 | Farley | A01D 41/14 |
| 2024/0245002 | A1 | 7/2024 | Cook, II et al. | |

FOREIGN PATENT DOCUMENTS

| | | | | |
|---|---|---|---|---|
| EP | 2422606 | A2 * | 2/2012 | A01D 41/14 |
| EP | 2250872 | | 1/2016 | |
| EP | 2745668 | | 3/2019 | |
| EP | 3750392 | A1 * | 12/2020 | A01D 41/14 |
| WO | WO-2022251185 | A1 * | 12/2022 | A01D 61/004 |

* cited by examiner

BACKSHEET EXTENSION FOR AN AGRICULTURAL HEADER

BACKGROUND

The present disclosure relates generally to a backsheet extension for an agricultural header.

A harvester may be used to harvest agricultural crops, such as barley, beans, beets, carrots, corn, cotton, flax, oats, potatoes, rye, soybeans, wheat, or other plant crops. Furthermore, a combine (e.g., combine harvester) is a type of harvester generally used to harvest certain crops that include grain (e.g., barley, corn, flax, oats, rye, wheat, etc.). During operation of a combine, the harvesting process may begin by removing agricultural crops from a field, such as by using a header. The header may cut the agricultural crops and transport the resulting crop material to a processing system of the combine.

Certain headers include a cutter bar assembly configured to cut a portion of each crop (e.g., a stalk), thereby separating the crop material from the soil. The cutter bar assembly may extend along a substantial portion of the width of the header at a forward end of the header. The header may also include one or more belts positioned behind the cutter bar assembly relative to the direction of travel of the harvester. The belt(s) are configured to transport the crop material to a central auger, which moves the crop material toward an inlet of the processing system. Certain headers include a reel assembly configured to direct the crop material from the cutter bar assembly toward the belt(s), thereby substantially reducing the possibility of the crop material falling onto the surface of the field.

Furthermore, certain headers include one or more compression augers positioned above the belt(s). The compression auger(s) may be used when harvesting crops that are particularly leafy to direct the crop material toward the belt(s). Unfortunately, the crop material may collect within the flighting of each compression auger, and/or each compression auger may drive some crop material to flow over the header. As a result, the efficiency of the harvesting process may be reduced.

SUMMARY

In certain embodiments, a backsheet extension for an agricultural header includes a deflector configured to couple to a top frame member of the agricultural header. The top frame member is positioned proximate to a compression auger of the agricultural header, and the deflector is configured to extend upwardly from the top frame member to block crop material from exiting the agricultural header. Furthermore, a leading edge of the deflector is configured to be positioned forward of the top frame member and to strip the crop material from the compression auger, and the deflector extends from the leading edge to a trailing edge.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Figure 1:
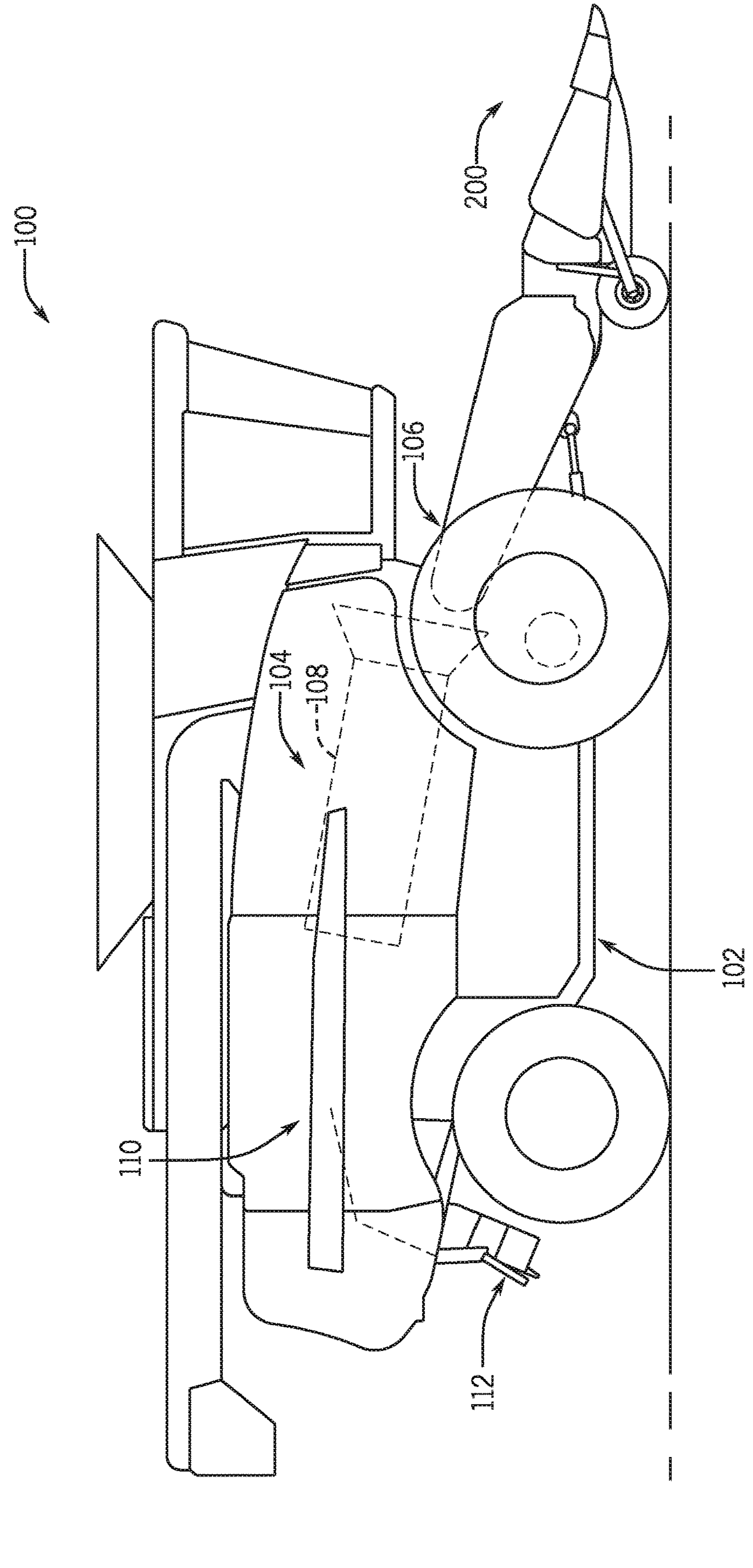
FIG. 1 is a side view of an embodiment of an agricultural harvester having a header.

FIG. 1 is a side view of an embodiment of an agricultural harvester 100 having a header 200 (e.g., agricultural header). The agricultural harvester 100 includes a chassis 102 configured to support the header 200 and an agricultural crop processing system 104. As described in greater detail below, the header 200 is configured to cut crops and to transport the resulting crop material (e.g., cut crops) toward an inlet 106 of the agricultural crop processing system 104 for further processing of the crop material. The agricultural crop processing system 104 receives the crop material from the header 200 and separates desired crop material from crop residue. For example, the agricultural crop processing system 104 may include a thresher 108 having a cylindrical threshing rotor that transports the crop material in a helical flow path through the harvester 100. In addition to transporting the crop material, the thresher 108 may separate certain desired crop material (e.g., grain) from the crop residue, such as husks and pods, and enable the desired crop material to flow into a cleaning system located beneath the thresher 108. The cleaning system may remove debris from the desired crop material and transport the desired crop material to a storage compartment within the harvester 100. The crop residue may be transported from the thresher 108 to a crop residue handling system 110, which may remove the crop residue from the harvester 100 via a crop residue spreading system 112 positioned at the aft end of the harvester 100.

As discussed in detail below, the header 200 includes a cutter bar assembly configured to cut the crops within the field. In certain embodiments, the header 200 also includes a reel assembly configured to urge crop material from the cutter bar assembly to one or more belts that convey the crop material toward the inlet 106 of the agricultural crop processing system 104. Furthermore, in certain embodiments, the header 200 includes a central auger positioned downstream from the belt(s) and configured to move the crop material toward the agricultural crop processing system via rotation of the central auger. The central auger includes a shaft and a flighting extending radially outwardly from the shaft. The central auger may be driven to rotate, thereby driving the flighting to rotate. The rotating flighting engages the crop material and moves the crop material toward the agricultural crop processing system.

In addition, as discussed in detail below, the header 200 includes one or more compression augers positioned above the belt(s). Each compression auger is configured to direct the crop material to a respective belt (e.g., compress the crop material against the respective belt), thereby enhancing the effectiveness of the harvesting process. In certain embodiments, the header 200 includes a backsheet extension having a deflector, which is coupled to a top frame member of the header 200. The deflector extends upwardly from the top frame member to block crop material from exiting the header. Furthermore, a leading edge of the deflector is positioned forward of the top frame member, and the leading edge is configured to strip the crop material from the compression auger. The deflector extends from the leading edge to a trailing edge and facilitates flow of the crop material that contacts the deflector toward the compression auger. Because the deflector blocks crop material from exiting the header, the amount of crop material entering the crop processing system may be enhanced, thereby increasing the efficiency of the harvesting operation. Furthermore, because the leading edge of the deflector strips the crop material from the compression auger, crop material accumulation within the flighting of the compression auger may be substantially reduced, thereby enhancing the effectiveness of the compression auger. As a result, the amount of crop material entering the crop processing system may be enhanced, thereby increasing the efficiency of the harvesting operation. In addition, because the leading edge of the deflector strips the crop material from the compression auger, the cost, complexity, and weight of the header may be reduced (e.g., as compared to a header that has a backsheet extension and a separate stripping feature).

Figure 2:
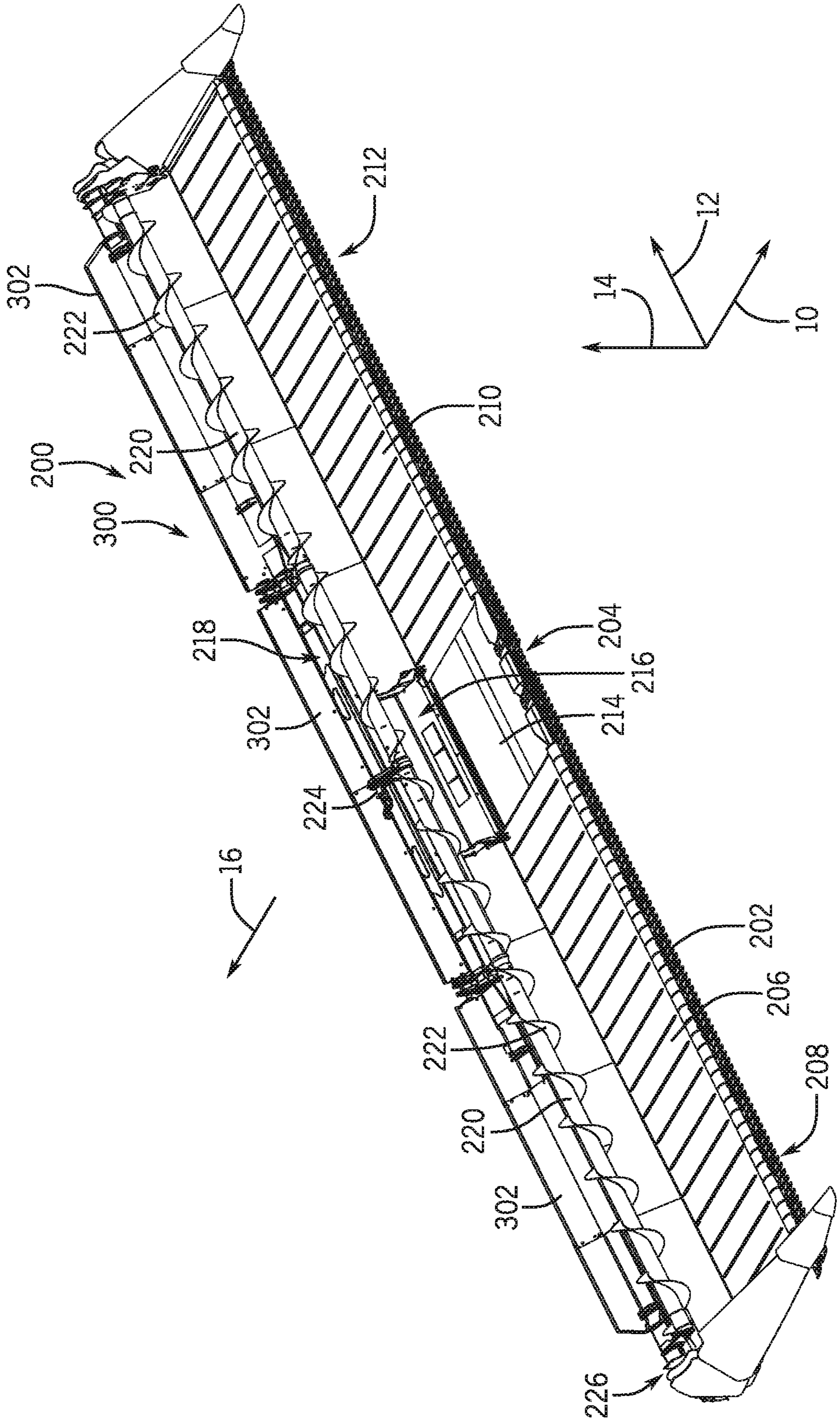
FIG. 2 is a perspective view of an embodiment of a header that may be employed within the agricultural harvester of FIG. 1.

FIG. 2 is a perspective view of an embodiment of a header 200 that may be employed within the agricultural harvester of FIG. 1. In the illustrated embodiment, the header 200 includes a cutter bar assembly 202 configured to cut a portion of each crop (e.g., a stalk), thereby separating the crop from the soil. The cutter bar assembly 202 is positioned at a forward end of the header 200 with respect to a longitudinal axis 10 of the header 200. As illustrated, the cutter bar assembly 202 extends along a substantial portion of the width of the header 200 (e.g., the extent of the header 200 along a lateral axis 12). The cutter bar assembly includes one or more blade supports, a stationary guard assembly, and a moving blade assembly. The moving blade assembly is fixed to the blade support(s) (e.g., above the blade support(s) with respect to a vertical axis 14 of the header 200), and the blade support(s)/moving blade assembly is driven to oscillate relative to the stationary guard assembly. In the illustrated embodiment, the blade support(s)/moving blade assembly is driven to oscillate by a knife drive 204 positioned at the lateral center of the header 200. As the harvester moves through a field, the cutter bar assembly 202 engages crops within the field, and the moving blade assembly cuts the crops (e.g., the stalks of the crops) in response to engagement of the cutter bar assembly 202 with the crops.

In the illustrated embodiment, the header 200 includes a first lateral belt 206 on a first lateral side 208 of the header 200 and a second lateral belt 210 on a second lateral side 212 of the header 200, opposite the first lateral side 208. Each belt is driven to rotate by a suitable drive mechanism, such as an electric motor or a hydraulic motor. The first lateral belt 206 and the second lateral belt 210 are driven such that the top surface of each belt moves laterally inwardly. In addition, the header 200 includes a longitudinal belt 214 positioned between the first lateral belt 206 and the second lateral belt 210 with respect to the lateral axis 12. The longitudinal belt 214 is driven to rotate by a suitable drive mechanism, such as an electric motor or a hydraulic motor. The longitudinal belt 214 is driven such that the top surface of the longitudinal belt 214 moves rearwardly with respect to the longitudinal axis 10.

In certain embodiments, the crop material (e.g., cut crops) cut by the cutter bar assembly 202 are directed toward the belts by a reel assembly, thereby substantially reducing the possibility of the crop material falling onto the surface of the field. The reel assembly may include a reel having multiple tines. The reel assembly may also include a rotating structure that is driven to rotate (e.g., by one or more electric motors, by one or more hydraulic motors, etc.). Furthermore, the reel may include multiple bat tubes rotatably coupled to the rotating structure, and a respective set of tines may be coupled to each bat tube. The reel assembly may include tine rotation mechanism(s) (e.g., cam and follower assembly/assemblies or parallel state assembly/assemblies). Each tine rotation mechanism is configured to drive the bat tubes to rotate relative to the rotating structure (e.g., in response to rotation of the rotating structure). Accordingly, the tines rotate in a first pattern (e.g., circular pattern) about the rotational axis of the rotating structure and in second patterns (e.g., circular patterns or oscillating patterns) about the rotational axes of respective bat tubes. The tines are configured to engage the crop material and to urge the crop material to move toward the belts. The crop material that contacts the top surface of each lateral belt is driven laterally inwardly to the longitudinal belt due to the movement of the lateral belt. In addition, the crop material that contacts the longitudinal belt 214 and the crop material provided to the longitudinal belt by the lateral belts is driven rearwardly with respect to the longitudinal axis 10 (e.g., along a rearward direction 16) due to the movement of the longitudinal belt 214.

In certain embodiments, the header includes a central auger positioned downstream from the belts and configured to move the crop material toward the agricultural crop processing system via rotation of the central auger. For example, the central auger may be positioned rearward of the longitudinal belt 214 with respect to the longitudinal axis 10 (e.g., along the rearward direction 16) and within an opening 216 of the header 200. Accordingly, the central auger may receive the crop material from the longitudinal belt 214 and move the crop material along the rearward direction 16 through the opening 216 and toward the inlet of the agricultural crop processing system.

In the illustrated embodiment, the header 200 includes compression augers 218 positioned above the belts and extending along a substantial portion of the width of the header 200. The compression augers 218 are configured to direct the crop material toward the belts (e.g., compress the crop material against the belts), thereby reducing the amount of crop material that flows over the header 200. For example, the compression augers 218 may be used when harvesting crops that are particularly leafy. Each compression auger 218 includes a shaft 220 and a flighting 222 extending radially outwardly from the shaft 220. The compression augers 218 may be driven to rotate by one or more motors 224, thereby driving the flighting 222 to rotate. The flighting 222 engages the crop material and, in response to rotation of the flighting 222, moves the crop material downwardly toward the belts and, in certain embodiments, laterally inwardly toward the opening 216. The compression augers 218 may be driven to rotate by any suitable number of motors 224 (e.g., 1, 2, 3, 4, 5, 6, or more), and the motor(s) may include any suitable type(s) of motor(s), such as electric motor(s), hydraulic motor(s), pneumatic motor(s), other suitable type(s) of motor(s), or a combination thereof. Furthermore, while the compression augers 218 is driven to rotate by motor(s) 224 in the illustrated embodiment, in other embodiments, the compression augers may be driven to rotate by another suitable drive system, such as a power take-off system, a ground engaging wheel mechanically coupled to the compression augers, etc. Furthermore, in the illustrated embodiment, the header 200 includes four compression augers 218. However, in other embodiments, the header may include more or fewer compression augers (e.g., 1, 2, 3, 5, 6, or more).

In the illustrated embodiment, the header 200 includes a frame 226 configured to support the cutter bar assembly 202, the belts, the reel assembly, the central auger, the compression augers 218, and other components of the header. As discussed in detail below, the frame 226 includes one or more top frame members and one or more bottom frame members. The top frame member(s) are positioned above a vertical midpoint of the header 200 (e.g., a midpoint of the header 200 along the vertical axis 14), and the bottom frame member(s) are positioned below the vertical midpoint of the header 200. Furthermore, in certain embodiments, the frame may include one or more support members extending between each top frame member and a respective bottom frame member, thereby establishing the structure of the frame 226. In addition, in the illustrated embodiment, the header 200 includes backsheet(s) extending downwardly from the top member(s). The backsheet(s) are configured to block crop material from flowing through the header (e.g., in the rearward direction 16), thereby enabling the belts to convey the agricultural product to the central auger.

In the illustrated embodiment, the header 200 includes a backsheet extension 300 having one or more deflectors 302, in which each deflector 302 is coupled to one or more top frame members of the header 200. As illustrated, the backsheet extension 300 extends along a substantial portion of the width of the header 200. Each deflector 302 extends upwardly from the top frame member(s) to block crop material from exiting the header 200. Furthermore, a leading edge of the deflector 302 is positioned forward of the top frame member(s), and the leading edge is configured to strip the crop material from one or more compression augers 218. The deflector 302 extends from the leading edge to a trailing edge and facilitates flow of the crop material that contacts the deflector toward the compression auger. In the illustrated embodiment, the backsheet extension 300 has eight deflectors. However, in other embodiments, the backsheet extension may have more or fewer deflectors (e.g., 1, 2, 3, 4, 5, 6, 7, 9, 10, 11, 12, or more). Because the deflector(s) 302 block crop material from exiting the header 200, the amount of crop material entering the crop processing system may be enhanced, thereby increasing the efficiency of the harvesting operation. Furthermore, because the leading edge of each deflector strips the crop material from one or more compression augers, crop material accumulation within the flighting(s) of the compression auger(s) may be substantially reduced, thereby enhancing the effectiveness of the compression auger(s). As a result, the amount of crop material entering the crop processing system may be enhanced, thereby increasing the efficiency of the harvesting operation. In addition, because the leading edge of each deflector strips the crop material from one or more compression augers, the cost, complexity, and weight of the header may be reduced (e.g., as compared to a header that has a backsheet extension and separate stripping feature(s)).

Figure 3:
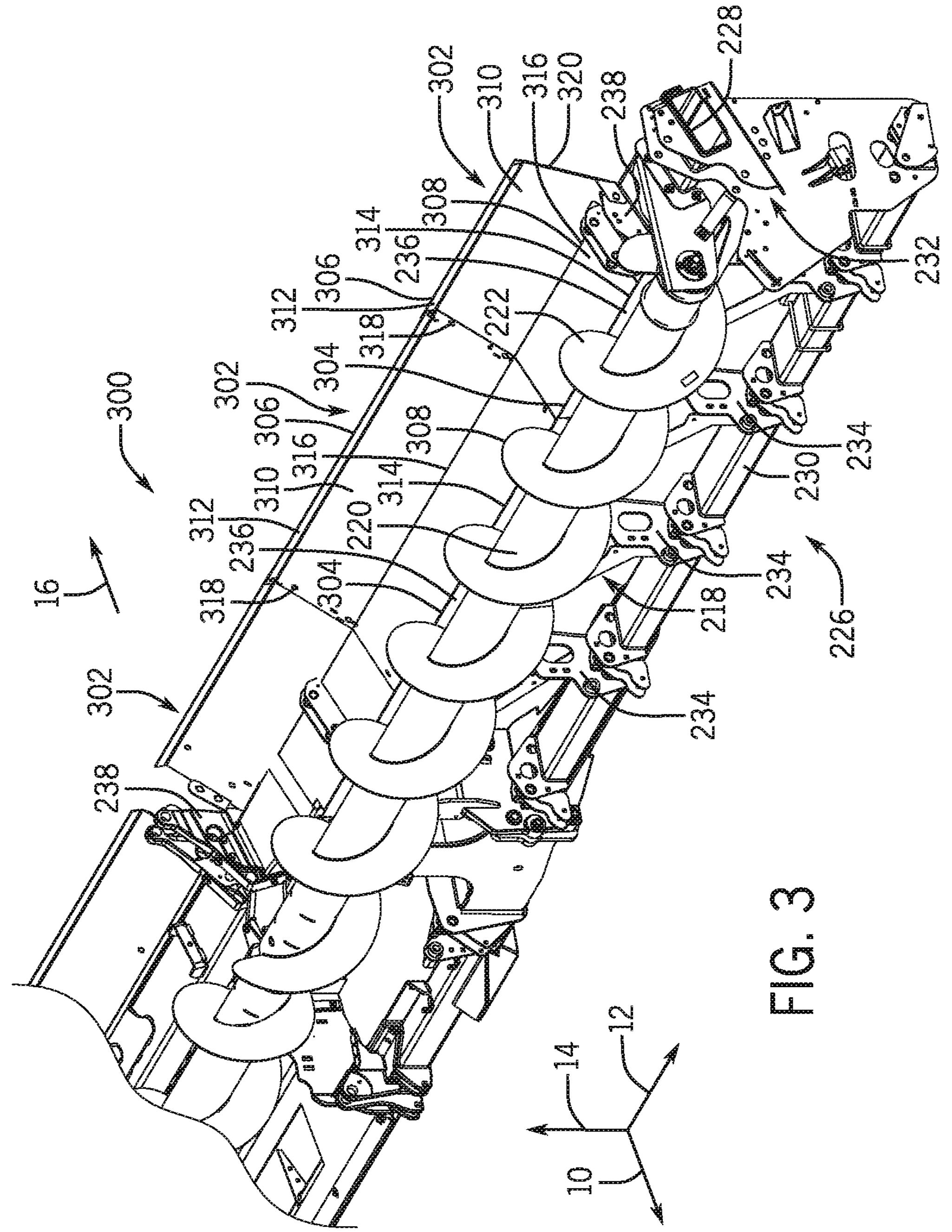
FIG. 3 is a perspective view of an embodiment of a backsheet extension that may be employed within the header of FIG. 2.

FIG. 3 is a perspective view of an embodiment of a backsheet extension 300 that may be employed within the header of FIG. 2. As previously discussed, the header includes compression auger(s) 218 configured to direct crop material toward the belts (e.g., compress the crop material against the belts), thereby reducing the amount of crop material that flows over the header. Each compression auger 218 includes a shaft 220 and a flighting 222 extending radially outwardly from the shaft 220. The flighting 222 engages the crop material and, in response to rotation of the flighting 222, moves the crop material downwardly toward the belts. In the illustrated embodiment, the flighting 222 of each compression auger 218 includes a single spiral blade, and the spiral blade is configured to move the crop material downwardly toward the belts and laterally inwardly toward the opening of the header. While the flighting of each compression auger includes a single spiral blade in the illustrated embodiment, in other embodiments, the flighting may include multiple spiral blades (e.g., with the same twist direction or with different twist directions). Furthermore, in certain embodiments, the flighting may include other suitable type(s) of flighting element(s) (e.g., alone or in combination with the spiral blade(s)), such as protrusion(s), plate(s), other suitable flighting element(s), or a combination thereof. For example, in certain embodiments, the flighting of at least one compression auger may move the crop material downwardly toward respective belt(s) without moving the crop material laterally inwardly.

In addition, as previously discussed, the frame 226 of the header is configured to support the cutter bar assembly, the belts, the reel assembly, the central auger, the compression augers 218, and other components of the header. In the illustrated embodiment, the frame 226 includes one or more top frame members 228 and one or more bottom frame members 230. The top frame member(s) 228 are positioned above a vertical midpoint 232 of the header (e.g., a midpoint of the header along the vertical axis 14), and the bottom frame member(s) 230 are positioned below the vertical midpoint 232 of the header. Furthermore, each top frame member 228 is positioned proximate to a compression auger 218. In the illustrated embodiment, the frame 226 includes one or more support members 234 extending between each top frame member 228 and one or more respective bottom frame members 230, thereby establishing the structure of the frame 226. While the frame 226 includes top frame member(s) 228, bottom frame member(s) 230, and support member(s) 234 in the illustrated embodiment, in other embodiments, the frame may have any other suitable configuration. For example, in certain embodiments, the bottom frame member(s) and/or the support member(s) may be omitted.

In addition, in the illustrated embodiment, the header includes backsheet(s) 236 extending downwardly from the top member(s) 228. The backsheet(s) 236 are configured to block crop material from flowing through the agricultural header (e.g., in the rearward direction 16), thereby enabling the belts to convey the agricultural product to the central auger. In certain embodiments, each backsheet is formed from a single flat sheet of material (e.g., metal, polymeric material, composite material, etc.). However, in other embodiments, at least one backsheet may be formed from a sheet of material having another suitable shape (e.g., curved, angled, etc.). Furthermore, while each backsheet disclosed above is formed from a single sheet of material, in certain embodiments, at least one backsheet may be formed from other suitable element(s) (e.g., multiple sheets of material coupled to one another, one or more blocks of material, at least one three-dimensionally printed element, at least one cast element, etc.). In addition, each backsheet 236 may be coupled to top frame member(s) 228, support member(s) 234, bottom frame member(s) 230, or a combination thereof, by any suitable type(s) of connection(s), such as fastener connection(s), welded connection(s), adhesive connection(s), other suitable type(s) of connection(s), or a combination thereof.

In the illustrated embodiment, the header includes a backsheet extension 300 having one or more deflectors 302, in which each deflector 302 is coupled to one or more top frame members 228 of the header. As illustrated, each deflector 302 extends upwardly (e.g., with respect to the vertical axis 14) from the top frame member 228 to block crop material from exiting the header. Furthermore, a leading edge 304 of each deflector 302 is positioned forward of the respective top frame member(s) 228 (e.g., with respect to the longitudinal axis 10), and the leading edge 304 is configured to strip the crop material from one or more compression augers 218. Each deflector 302 extends from the leading edge 304 to a trailing edge 306 and facilitates flow of crop material that contacts the deflector toward the compression auger(s) 218. For example, the compression auger(s) 218 may break apart certain crop material, thereby causing particles of the crop material (e.g., seeds, such as canola seeds and grape seeds) to move upwardly and rearwardly. The deflector(s) 302 may block the particles of crop material from exiting the header, and the particles of crop material may flow along the deflector(s) under the influence of gravity toward the compression auger(s) 218. As a result, the particles of crop material may be received by the belt(s) and directed toward the crop processing system. In certain embodiments, at least one deflector (e.g., each deflector) extends continuously from the leading edge to the trailing edge. As used herein, “continuously” refers to a surface that does not have significant gaps (e.g., gaps that enable crop material to enter) and that does not have interruptions (e.g., that block movement of crop material along the surface). Because each deflector 302 blocks crop material from exiting the header 200, the amount of crop material entering the crop processing system may be enhanced, thereby increasing the efficiency of the harvesting operation. Furthermore, because the leading edge 304 of each deflector 302 strips the crop material from the compression auger(s) 218, crop material accumulation within the flighting(s) 222 of the compression auger(s) 218 may be substantially reduced, thereby enhancing the effectiveness of the compression auger(s) 218. As a result, the amount of crop material entering the crop processing system may be enhanced, thereby increasing the efficiency of the harvesting operation. In addition, because the leading edge 304 of each deflector 302 strips the crop material from the compression auger(s) 218, the cost, complexity, and weight of the header may be reduced (e.g., as compared to a header that has a backsheet extension and separate stripping feature(s)).

In the illustrated embodiment, each deflector 302 has a first flat section 308 and a second flat section 310. The first flat section 308 is positioned on a top surface of the respective top frame member(s) 228, and the second flat section 310 extends upwardly (e.g., with respect to the vertical axis 14) and rearwardly (e.g., along the rearward direction 16) from the first flat section 308. Furthermore, in the illustrated embodiment, each deflector 302 has a third flat section 312 extending upwardly (e.g., with respect to the vertical axis 14) from the second flat section 310. The leading edge 304 is formed at a first longitudinal end 314 of the first flat section 308, and the second flat section 310 extends from a second longitudinal end 316 of the first flat section, opposite the first longitudinal end 314. In addition, the trailing edge 306 of each deflector 302 is formed at the third flat section 312. The three flat sections of each deflector 302 cooperate to direct the crop material toward the compression auger(s) 218, thereby blocking crop material from exiting the agricultural header.

While each deflector 302 has three sections in the illustrated embodiment, in certain embodiments, at least one deflector may have more or fewer sections (e.g., 1, 2, 4, 5, or more). For example, in certain embodiments, the third section may be omitted from at least one deflector. Furthermore, while each section is flat in the illustrated embodiment, in other embodiments, at least one section of at least one deflector may have another suitable shape (e.g., curved, wavy, etc.). In addition, while the second section of each deflector extends upwardly and rearwardly in the illustrated embodiment, in other embodiments, the second section of at least one deflector may extend in another suitable direction. While the third section of each deflector extends upwardly in the illustrated embodiment, in other embodiments, the third section of at least one deflector may extend in another suitable direction. Furthermore, while the second section of each deflector extends from the second longitudinal end of the first section in the illustrated embodiment, in other embodiments, the second section of at least one deflector may extend from another suitable area of the first section, such as the first longitudinal end. For example, in embodiments in which the second section extends from the first longitudinal end of the first section, the leading edge may be formed at the intersection of the first and second sections. Furthermore, while the leading edge is formed at the first longitudinal end of the first section of each deflector in the illustrated embodiment, in other embodiments, the leading edge of at least one deflector may be formed at another suitable portion of the first section, such as at a longitudinal protrusion.

In the illustrated embodiment, the first flat section 308, the second flat section 310, and the third flat section 312 of each deflector 302 are formed from a single sheet of material (e.g., the entirety of the deflector is formed from a single sheet of material). The single sheet of material may be formed from metal (e.g., stainless steel, aluminum, etc.), a polymeric material (e.g., polycarbonate, polypropylene, polyethylene, polyvinyl chloride, etc.), a composite material (e.g., fiberglass, carbon fiber, etc.), other suitable material(s), or a combination thereof. While the sections of each deflector (e.g., the entirety of the deflector) is formed from a single sheet of material in the illustrated embodiment, in other embodiments, the sections of at least one deflector may be formed from multiple elements coupled to one another (e.g., including one or more sheets of material, one or more blocks of material, one or more cast elements, one or more three-dimensionally printed elements, or a combination thereof). For example, in certain embodiments, the first flat section and the second flat section of at least one deflector may be formed from a single sheet of material, and the third flat section may be formed from different element(s) and coupled to the single sheet of material. Furthermore, in certain embodiments, the first flat section, the second flat section, and the third flat section may be formed from different element(s) and coupled to one another. In embodiments in which the sections of at least one deflector are formed from multiple elements, the elements may be coupled to one another by any suitable type(s) of connection (s), such as welded connection(s), fastener connection(s), adhesive connection(s), press-fit connection(s), other suitable type(s) of connection(s), or a combination thereof.

As previously discussed, each deflector 302 of the backsheet extension 300 is coupled to one or more top frame members 228. In the illustrated embodiment, multiple deflectors 302 are coupled to one another to form a group of deflectors, and the laterally outward deflectors 302 of the group are coupled to one top frame member 228 via respective brackets 238. Each bracket 238 may be coupled to the top frame member 228 directly (e.g., via a welded connection, a fastener connection, an adhesive connection, other suitable type(s) of connection(s), or a combination thereof) or indirectly (e.g., via one or more other elements). While the laterally outward deflectors 302 are coupled to the top frame member 228 via brackets 238 in the illustrated embodiment, in certain embodiments, at least one laterally outward deflector may be coupled to the top frame member directly and/or indirectly via other suitable element(s) (e.g., any combination of directly, indirectly, and via the bracket). For example, at least one laterally outward deflector may be coupled to the top frame member by a welded connection, a fastener connection, an adhesive connection, other suitable type(s) of connection(s), or a combination thereof (e.g., alone or in combination with the connection via the bracket).

In the illustrated embodiment, the deflectors 302 of the group are coupled to one another via fastener connections having fasteners 318. However, in other embodiments, at least two deflectors of the group may be coupled to one another by other suitable type(s) of connection(s) (e.g., alone or in combination with the fastener connection(s)), such as welded connection(s), adhesive connection(s), other suitable type(s) of connection(s), or a combination thereof. Furthermore, in certain embodiments, at least two deflectors of the group may not be coupled to one another. In such embodiments, the at least two deflectors may be coupled to the top frame member (e.g., directly or indirectly). For example, in certain embodiments, each deflector of the group may be independently coupled to the top frame member.

In the illustrated embodiment, each deflector 302 positioned at a lateral end of the backsheet extension 300 includes a fourth flat section 320 configured to block laterally outward movement of the crop material. As illustrated, the fourth flat section 320 engages the third section 312 and the second section 310. For example, in certain embodiments, the first section 308, the second section 310, the third section 312, and the fourth flat section 320 may be formed from a single sheet of material. However, in other embodiments, the fourth flat section may be formed as a separate element (e.g., sheet of material, block of material, cast element, three-dimensionally printed element, etc.) and coupled to the third section and/or the second section. Furthermore, while the fourth section is flat in the illustrated embodiment, in other embodiments, the fourth section may have another suitable shape (e.g., curved, angled, etc.). In addition, while each deflector positioned at a lateral end of the backsheet extension includes a fourth section in the illustrated embodiment, in other embodiments, the fourth section may be omitted from at least one deflector positioned at a lateral end of the backsheet extension.

Figure 4:
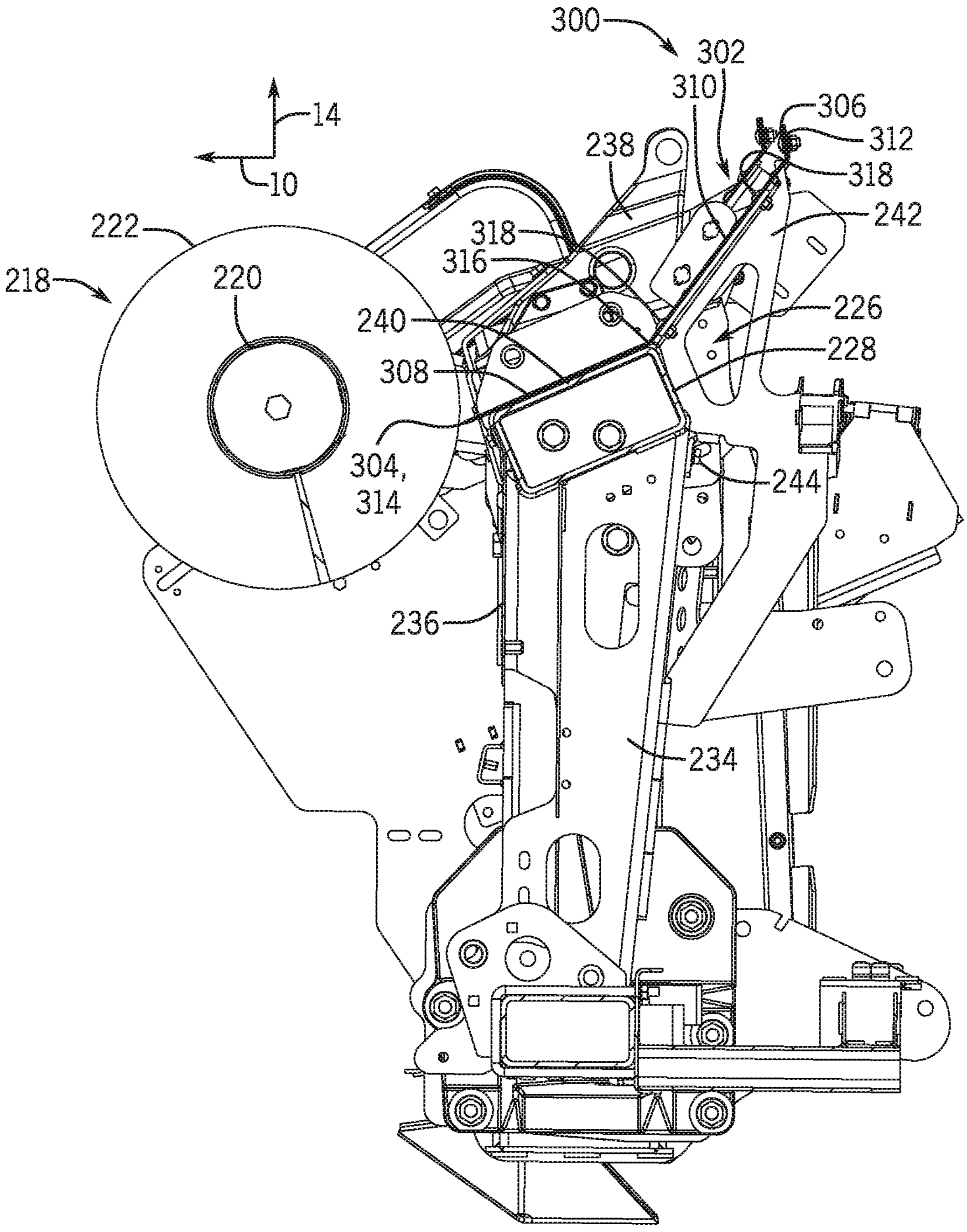
FIG. 4 is a cross-sectional view of the backsheet extension of FIG. 3.

FIG. 4 is a cross-sectional view of the backsheet extension 300 of FIG. 3. As previously discussed, the deflector 302 of the backsheet extension 300 is coupled to the top frame member 228, and the deflector 302 extends upwardly (e.g., with respect to the vertical axis 14) from the top frame member 228. In addition, the deflector 302 is configured to block crop material from exiting the header. The leading edge 304 of the deflector 302 is positioned forward of the top frame member 228 (e.g., with respect to the longitudinal axis 10), and the leading edge 304 is configured to strip the crop material from the compression auger 218. Furthermore, as previously discussed, the deflector 302 extends from the leading edge 304 to the trailing edge 306. The backsheet 236 extends downwardly (e.g., with respect to the vertical axis 14) from the top frame member 228, and the backsheet 236 is configured to block the crop material from flowing through the header.

In the illustrated embodiment, the first flat section 308 of the deflector 302 is positioned on a top surface 240 of the top frame member 228. In certain embodiments, the deflector 302 is coupled to the top surface 240 of the top frame member 228 at the first flat section 308 (e.g., via a welded connection, a fastener connection, an adhesive connection, other suitable type(s) of connection(s), or a combination thereof). While the first flat section 308 of the deflector 302 is positioned on the top surface 240 of the top frame member 228 in the illustrated embodiment, in other embodiments, the first flat section may be positioned in another suitable location. For example, the first flat section may be positioned above the top frame member, and another section of the deflector may extend between the first flat section and the top frame member.

In the illustrated embodiment, the top frame member 228 is angled downwardly toward the compression auger 218, such that the first longitudinal end 314 of the first flat section 308 is positioned lower (e.g., with respect to the vertical axis 14) than the second longitudinal end 316 of the first flat section 308. Accordingly, the first flat section 308 of the deflector 302 is angled downwardly toward the compression auger 218. As such, crop material that engages the deflector 302 may be directed toward the compression auger 218 under the influence of gravity. While the first flat section is angled downwardly toward the compression auger in the illustrated embodiment, in other embodiments, the first flat section may be substantially parallel to the longitudinal axis 10 or angled upwardly toward the compression auger.

In the illustrated embodiment, the header includes one or more mounting supports 242 configured to support the deflectors and to couple the deflectors to the frame 226. As illustrated, a mounting support 242 is coupled to deflectors via the fasteners 318 that couple the deflectors to one another. In addition, the mounting support 242 is coupled to a support member 234 via a fastener connection having fastener(s) 244. While a mounting support coupled to two deflectors via a fastener connection is disclosed above, in certain embodiments, at least one mounting support may be coupled to a single deflector via a fastener connection, and/or at least one mounting support may be coupled to multiple deflectors via multiple respective fastener connections. Furthermore, while coupling each mounting support to deflector(s) via fastener connection(s) is disclosed above, in certain embodiments, at least one mounting support may be coupled to one or more deflectors by other suitable type(s) of connection(s) (e.g., alone or in combination with the fastener connection(s)), such as welded connection(s), adhesive connection(s), other suitable type(s) of connection(s), or a combination thereof. In addition, while a mounting support coupled to a support member is disclosed above, in certain embodiments, at least one mounting support may be coupled to other suitable element(s) of the frame (e.g., alone or in combination with the mounting support), such as the top frame member and/or the bottom frame member. Furthermore, while a mounting support coupled to the frame via a fastener connection is disclosed above, in certain embodiments, at least one mounting support may be coupled to the frame via other suitable type(s) of connection (s) (e.g., alone or in combination with the fastener connection), such as an adhesive connection, a welded connection, other suitable type(s) of connection(s), or a combination thereof. In certain embodiments, at least a portion of the mounting supports (e.g., all of the mounting supports) may be omitted.

In certain embodiments, the header may include one or more features (e.g., in addition to the leading edge of the deflector) configured to strip the crop material from the compression auger. For example, in certain embodiments, one or more stripping features may be mounted on the backsheet and/or the top frame member, and each stripping feature may be configured to strip the crop material from the compression auger. While one deflector 302 is discussed with regard to FIG. 4, any of the features, details, and variations disclosed with regard to the deflector 302 may applied to any or all of the deflectors of the backsheet extension.

In certain embodiments, the backsheet extension may include at least one adjustment mechanism configured to enable adjustment of position(s) and/or angle(s) of the deflector(s) relative to the frame of the header. For example, at least one adjustment mechanism may enable adjustment of a vertical position (e.g., position with respect to the vertical axis) of the deflector(s) relative to the top frame member(s) and/or adjustment of a longitudinal position (e.g., position with respect to the longitudinal axis) of the deflector(s) relative to the top frame member(s). Additionally or alternatively, at least one adjustment mechanism may enable the deflector(s) to pivot about the lateral axis. Each adjustment mechanism may include any suitable assembly/assemblies configured to enable the deflector(s) to translate and/or pivot, such as a slider assembly, a tongue and groove assembly, a pivot assembly, other suitable assembly/assemblies, or a combination thereof. Furthermore, each adjustment mechanism may include any suitable device(s) configured to lock the deflector(s) in the desired position(s)/angle(s), such as a pin configured to engage one of an array of apertures, set screw(s), latch(es), other suitable device(s), or a combination thereof. Adjusting the position(s)/angle(s) of the deflector(s) may vary the position(s)/angle(s) of the leading edge(s) of the deflector(s) relative to the compression auger(s). Accordingly, the position(s)/angle(s) of the deflector(s) and the element(s) configured to strip crop material from the compression auger(s) (e.g., leading edge(s) of the deflector(s)) may be varied with one adjustment (e.g., as compared to a configuration having independently movable stripping feature(s) and deflector(s), in which the stripping feature(s) and the deflector(s) are adjusted independently).

While only certain features have been illustrated and described herein, many modifications and changes will occur to those skilled in the art. It is, therefore, to be understood that the appended claims are intended to cover all such modifications and changes as fall within the true spirit of the disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for (perform)ing (a function) . . . " or "step for (perform)ing (a function) . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A backsheet extension for an agricultural header, comprising:

a deflector configured to couple to a top frame member of the agricultural header, wherein the top frame member is positioned proximate to a compression auger of the agricultural header, and the deflector is configured to extend upwardly from the top frame member to block crop material from exiting the agricultural header;

wherein a leading edge of the deflector is configured to be positioned forward of the top frame member and to strip the crop material from the compression auger, and the deflector extends from the leading edge to a trailing edge.

2. The backsheet extension of claim 1, wherein the deflector has a first flat section and a second flat section, the first flat section is configured to be positioned on a top surface of the top frame member, and the second flat section extends upwardly and rearwardly from the first flat section.

3. The backsheet extension of claim 2, wherein the leading edge is formed at a first longitudinal end of the first flat section.

4. The backsheet extension of claim 3, wherein the second flat section extends from a second longitudinal end of the first flat section, opposite the first longitudinal end.

5. The backsheet extension of claim 2, wherein the first flat section and the second flat section are formed from a single sheet of material.

6. The backsheet extension of claim 2, wherein the deflector has a third flat section extending upwardly from the second flat section.

7. An agricultural header, comprising:

a compression auger configured to direct crop material toward a belt of the agricultural header;

a top frame member positioned proximate to the compression auger; and a backsheet extension comprising a deflector coupled to the top frame member and extending upwardly from the top frame member, wherein the deflector is configured to block the crop material from exiting the agricultural header, a leading edge of the deflector is positioned forward of the top frame member, the leading edge is configured to strip the crop material from the compression auger, and the deflector extends from the leading edge to a trailing edge.

8. The agricultural header of claim 7, comprising a backsheet extending downwardly from the top frame member, wherein the backsheet is configured to block the crop material from flowing through the agricultural header.

9. The agricultural header of claim 7, wherein the deflector has a first flat section and a second flat section, the first flat section is positioned on a top surface of the top frame member, and the second flat section extends upwardly and rearwardly from the first flat section.

10. The agricultural header of claim 9, wherein the leading edge is formed at a first longitudinal end of the first flat section.

11. The agricultural header of claim 10, wherein the second flat section extends from a second longitudinal end of the first flat section, opposite the first longitudinal end.

12. The agricultural header of claim 10, wherein the top frame member is angled downwardly toward the compression auger, such that the first longitudinal end of the first flat section is positioned lower than a second longitudinal end of the first flat section, opposite the first longitudinal end.

13. The agricultural header of claim 9, wherein the first flat section and the second flat section are formed from a single sheet of material.

14. The agricultural header of claim 9, wherein the deflector has a third flat section extending upwardly from the second flat section.

15. A method of manufacturing an agricultural header, comprising:

coupling a deflector of a backsheet extension to a top frame member of the agricultural header, such that the deflector extends upwardly from the top frame member and a leading edge of the deflector is positioned forward of the top frame member, wherein the top frame member is positioned proximate to a compression auger of the agricultural header, the deflector is configured to block crop material from exiting the agricultural header, the leading edge of the deflector is configured to strip the crop material from the compression auger, and the deflector extends from the leading edge to a trailing edge.

16. The method of claim 15, wherein the deflector has a first flat section and a second flat section, the first flat section is configured to be positioned on a top surface of the top frame member, and the second flat section extends upwardly and rearwardly from the first flat section.

17. The method of claim 16, wherein the leading edge is formed at a first longitudinal end of the first flat section.

18. The method of claim 17, wherein the second flat section extends from a second longitudinal end of the first flat section, opposite the first longitudinal end.

19. The method of claim 16, comprising forming the first flat section and the second flat section from a single sheet of material.

20. The method of claim 16, wherein the deflector has a third flat section extending upwardly from the second flat section.

* * * * *